Feb. 2, 1943.  M. MAKIN  2,309,736
RE-THRESHER ATTACHMENTS FOR THRESHERS
Filed May 29, 1941  2 Sheets-Sheet 1
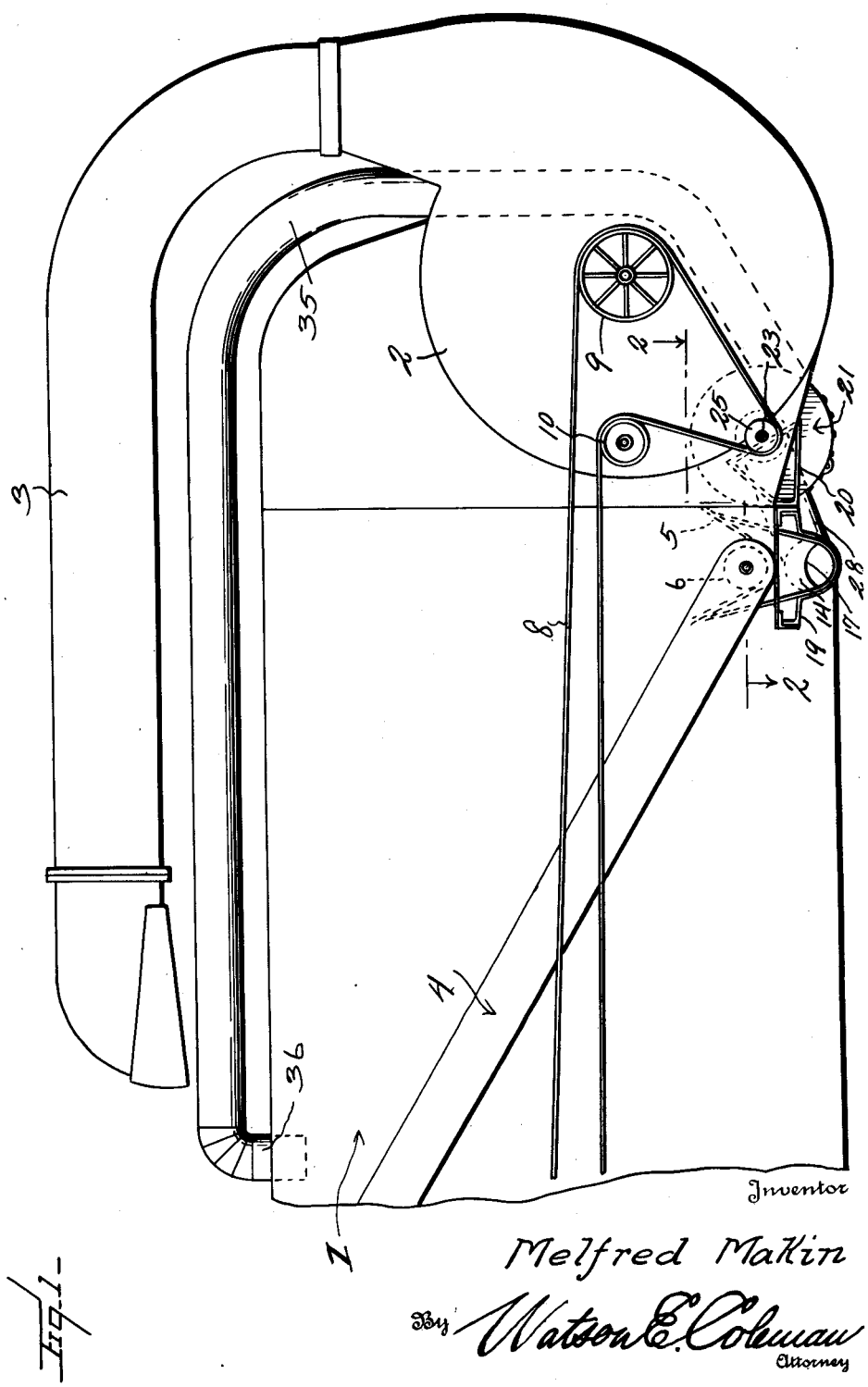
Inventor
Melfred Makin
By Watson E. Coleman
Attorney

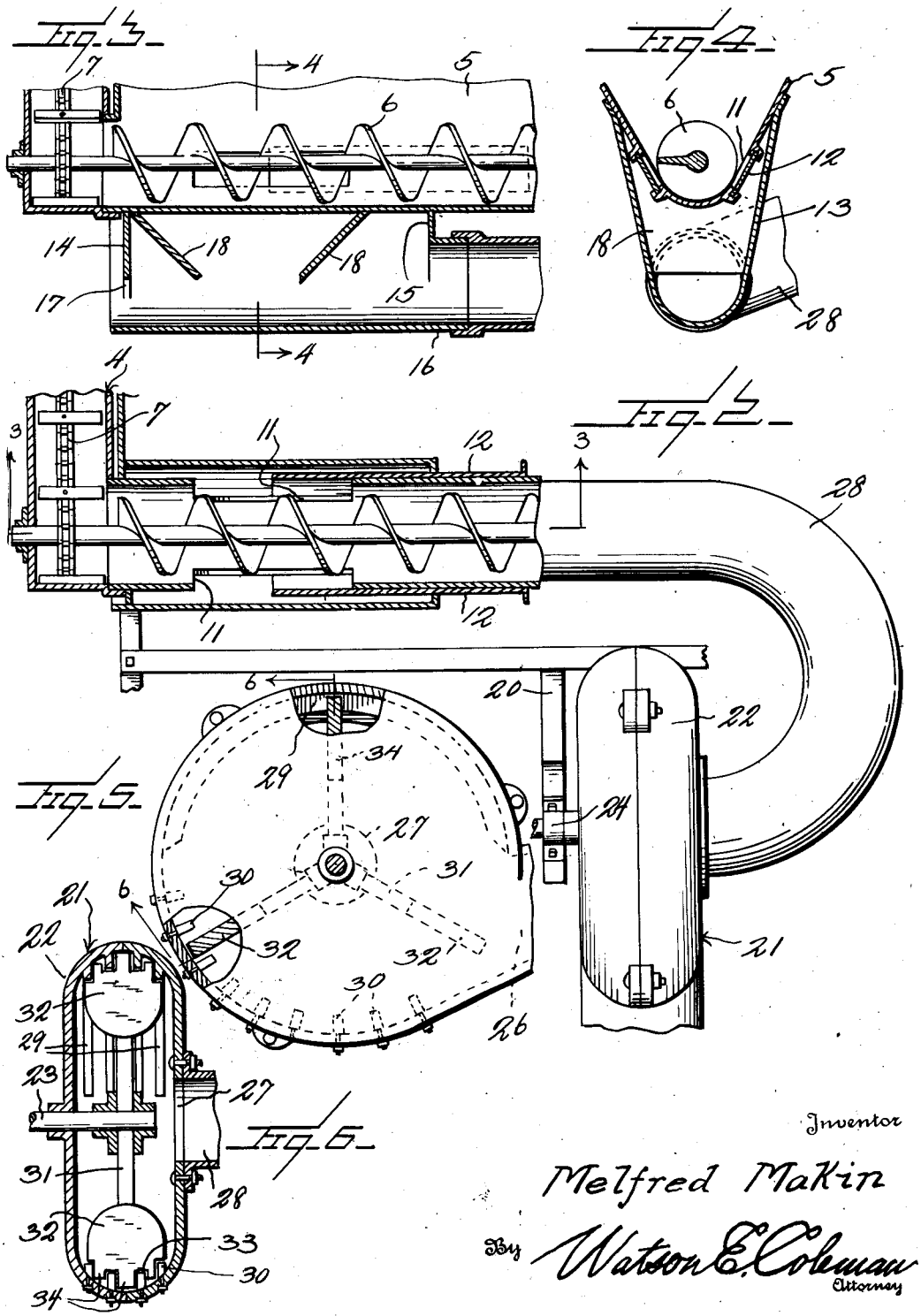

Patented Feb. 2, 1943

2,309,736

UNITED STATES PATENT OFFICE 2,309,736

RETHRESHER ATTACHMENT FOR THRESHERS

Melfred Makin, Ontario, Oreg.

Application May 29, 1941, Serial No. 395,890

3 Claims. (Cl. 130—27)

This invention relates generally to the class of harvesting machines and pertains particularly to a mechanism by which a rethreshing of portions of a harvested crop may be effected.

In threshing machines, a means is provided for returning to the concave and cylinder, tailings for re-threshing with a view to salvaging grain which may have passed unthreshed through the machine. This mechanism is not always effective in saving all of the grain which may have passed unthreshed through the machine and such grain may continue to go through with the other tailings indefinitely. Furthermore, the ordinary re-threshing mechanism of harvesters is unsuitable for handling damp seeds.

The present invention has for its primary object to provide a re-threshing mechanism which may be applied to any standard harvesting machine, which not only provides an effective means for re-threshing seed which may have passed through with the tailings from the first threshing operation, but also provides a mechanism which is particularly effective for harvesting damp seed.

Another object of the invention is to provide a re-thresher mechanism for attachment to a standard threshing machine which is coupled with the trough or tube of the tailings auger and which may be put into use as desired, to receive tailings which would ordinarily be carried by the auger to the drag chain for return to the beater cylinder, such tailings being carried through a special beater and blower forming a part of the present mechanism where the seed is effectively re-threshed and delivered under a blast of air to either the draper or the cylinder, where the chaff will be carried out in the customary manner and the seed will be collected in the seed pan.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view illustrating conventionally in side elevation the rear end portion of a thresher showing the location thereon of the present rethresher mechanism with respect to the tailings return mechanism of the machine.

Fig. 2 is a sectional view taken substantially on the line 2—2 of Fig. 1, with portions of the structure shown in elevation.

Fig. 3 is a sectional view on the line 3—3 of Fig. 2.

Fig. 4 is a sectional view on the line 4—4 of Fig. 3.

Fig. 5 is a view partly in side elevation and partly in section of the beater blower unit.

Fig. 6 is a sectional view on the line 6—6 of Fig. 5.

Referring now more particularly to the drawings, the numeral 1 generally designates the body portion of a harvesting machine at the rear end of which is shown the usual wind stacker fan 2 which is connected with the stacker pipe 3 by which chaff and straw is deposited outside of the machine. The pipe is here shown as turned in over the machine in inoperative position.

The numeral 4 designates the tailings elevator which receives tailings from the tailings trough 5, in which is located an auger 6 which carries the tailings to the endless chain mechanism 7 which forms a part of the tailings elevator to return the same into the threshing machine to the cylinder.

The driving belt for the stacker fan is indicated by the numeral 8, the same being extended around the pulley 9 and passing over an idler pulley 10. This belt is employed as hereinafter described, for the operation of the beater blower unit of the present improvement.

In accordance with the present invention, the auger trough 5 is provided adjacent the discharge end with the outlet openings 11, each of which is designed to be closed by a sliding gate 12. Beneath the trough 5 there is mounted a receptacle 13 which, as shown in Fig. 4, is substantially V-shaped in cross-section and is secured at the top edges of the sides thereof to the wall of the auger trough 5, the side walls of the receptacle extending over the outlets 11, so that when the gates 12 are opened, the tailings will be discharged from the auger trough into the receptacle. The gates 12 are of sufficient length to extend beyond one end of the receptacle 13, so that they may be readily reached to be shifted to opened or closed position. The ends of the trough are closed by the walls 14 and 15, the wall 15 having extending integrally therefrom the outlet nozzle 16, while the wall 14 is provided with an air inlet opening 17, the bottom of which is flush with the bottom of the receptacle.

Secured to the under side of the auger trough 5 and extending downwardly into the receptacle therefrom are the downwardly diverging baffle walls 18 upon which the tailings fall from the openings 11. In this manner the tailings are collected in the central part of the receptacle from which they may be drawn by suction, as hereinafter stated.

The receptacle 13 is supported upon a suitable framework 19, as shown in Fig. 1, and a bracket 20 secured to this framework supports a combined beater and blower unit 21. This unit includes a circular housing 22 in which is axially supported for rotation a fan shaft 23 which passes through a bearing 24 carried by the bracket 20 and extends to the outer side of the harvester machine where it carries a pulley 25. The drive belt 8 is passed around this pulley 25, as shown in Fig. 1, so that suitable rotary power may be applied to shaft 23 to produce a desired blast of air which is delivered from the unit housing 22 through the tangential outlet 26.

The inlet for the housing 22 is axial, as shown in Fig. 6, and is indicated by the numeral 27. Secured to the side of the housing over this inlet 27 is one end of a pipe 28 which has its other end connected to the discharge nipple 16 of the receptacle 13.

The upper half of the inner peripheral wall portion of the housing 22 is provided with a number of circumferentially directed ribs 29 while the lower half of the inner wall of the housing has secured thereto the radially inwardly directed teeth 30 which are arranged in rows extending in a circumferential direction and corresponding in position with the ribs 29.

Upon the shaft 23 within the housing 22, a series of radially directed arms 31 is secured, each of which carries a fan and beater paddle 32. These paddles conform in contour along their outwardly directed edges substantially with the interior transverse curvature of the housing wall and such edges are provided with recesses 33 to receive the rows of teeth and the ribs 29, thereby forming spaced paddle teeth 34 which work between the ribs and the teeth 30.

The outlet 26 of the housing is connected with a seed return pipe 35 which extends rearwardly and upwardly, as shown in Fig. 1, and then forwardly to terminate in the downwardly directed nozzle 36 which is introduced into the body of the threshing machine through the top thereof so as to discharge either just behind the beater or draper or it may be arranged to discharge directly onto the cylinder.

From the foregoing, it is believed that it will be readily apparent that in the operation of the present re-threshing attachment, when the gates 12 are opened to permit unthreshed seed to discharge from the tailings trough into the receptacle 13, such seed will be drawn by the beater-blower unit 21 into the housing 22 where the seed will be subjected to threshing action between the teeth of the fan blades and the teeth and ribs 30 and 29, respectively, with which the blades cooperate. The seed will then be discharged into the pipe 35 together with chaff, where they will be returned into the threshing machine either behind the beater or onto the cylinder, as may be desired, according to the location in which the nozzle 36 is placed. The present attachment is designed for any kind of crop harvester and the blower return for the re-threshed seed may be used to take the place of the elevator mechanism when desired, and it involves less working parts and is of particular advantage in harvesting damp seed. With this blower, the seed is dried and where particularly damp seed is being harvested, the return nozzle 36 will be located so that such seed will be delivered back onto the thresher beater cylinder.

Ordinarily, the trouble encountered in connection with the threshing of damp clover and alfalfa seed is in recovering a satisfactory percentage of unthreshed seed. This is practically impossible with the present machines. With this attachment from 50 to 75% of the original loss of clover and alfalfa seed will be recovered.

The present device also reduces the cost of threshing seed in that it recovers the bulk of the seed which first passes through the machine with the tailings, in one operation, whereas other equipment necessitates the returning of the unthreshed seed through the complete mechanism of the thresher several times before the husk of the seed is finally removed. It also permits the straw to remain coarser, making it less difficult to separate seed from straw, resulting in a saving of power because of the fact that the blower of the attachment develops a wind velocity of from 160 to 185 miles per hour and, therefore, makes it possible to operate the concave with fewer teeth than are at present used.

What is claimed is:

1. In a threshing machine having a tailings receiving trough, a receptacle disposed beneath said trough, a gate controlled discharge opening leading from the trough into the receptacle, a combined beater and blower unit including a housing having an inlet and an outlet, a pipe connecting said inlet with said receptacle, a pipe connected with said outlet and leading therefrom through the top of the thresher for the return of the re-threshed seed thereinto in the vicinity of the cylinder and beater, said thresher and blower unit further including toothed fan blades, and teeth carried by the wall of the housing within the same and coacting with the teeth of said blades for beating the seed.

2. In a threshing machine having a tailings trough, an elongated receptacle mounted beneath said tailings trough, means for controlling the discharge of seed from the trough into the receptacle, said receptacle having an air inlet at one end and a discharge nozzle at the other end, a beater blower unit comprising a circular housing, blower blades rotatably supported within the housing, said housing having an axial inlet opening and a tangential discharge, a pipe connecting said inlet opening of the housing with the outlet of the receptacle, a pipe connecting the discharge of the housing with and delivering threshed seed through the top of the threshing machine in the vicinity of the beater and cylinder, said blades having teeth in opposed relation with the peripheral wall of the housing, and means within the housing upon said peripheral wall which engage between said teeth upon rotation of the blades for beating the grain drawn into the housing.

3. In a threshing machine having a tailings trough, an elongated repectacle mounted beneath said tailings trough, means for controlling the discharge of seed from the trough into the receptacle, said receptacle having an air inlet at one end and a discharge nozzle at the other end, a beater blower unit comprising a circular housing, blower blades rotatably supported within the housing, said housing having an axial inlet opening and a tangential discharge, a pipe connecting said inlet opening of the housing with the outlet of the receptacle, a pipe connecting the discharge of the housing with and delivering threshed seed through the top of the threshing machine in the vicinity of the beater and cylinder, said blades having teeth in opposed relation with the peripheral wall of the housing, a plurality of ribs extending partially circumferentially within the housing upon the peripheral wall to engage between the teeth of the blades, and a plurality of rows of teeth disposed within the housing upon the inner wall thereof and in the opposite half of the housing from the ribs to engage between said blade teeth to cooperate therewith in threshing the grain.

MELFRED MAKIN.